United States Patent
Liu et al.

(10) Patent No.: US 8,452,318 B2
(45) Date of Patent: May 28, 2013

(54) METHOD AND SYSTEMS FOR POWER OVERLOAD CONTROL OF THE TRUNKING GROUP FORWARD SUPPLEMENTAL CHANNEL

(75) Inventors: Xiaohan Liu, Guangdong Province (CN); Xuemin Liu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 932 days.

(21) Appl. No.: 12/064,544

(22) PCT Filed: Jun. 8, 2006

(86) PCT No.: PCT/CN2006/001244
§ 371 (c)(1),
(2), (4) Date: Jun. 27, 2008

(87) PCT Pub. No.: WO2007/036102
PCT Pub. Date: Apr. 5, 2007

(65) Prior Publication Data
US 2008/0268891 A1    Oct. 30, 2008

(30) Foreign Application Priority Data
Sep. 29, 2005    (CN) .......................... 2005 1 0086541

(51) Int. Cl.
*H04B 7/00*    (2006.01)
(52) U.S. Cl.
USPC .......................................... 455/522; 455/520
(58) Field of Classification Search
None
See application file for complete search history.

(56) References Cited

U.S. PATENT DOCUMENTS

| | | | | | |
|---|---|---|---|---|---|
| 5,175,866 | A | * | 12/1992 | Childress et al. | 455/8 |
| 5,842,114 | A | * | 11/1998 | Ozluturk | 455/69 |
| 5,893,035 | A | * | 4/1999 | Chen | 455/522 |
| 6,094,585 | A | * | 7/2000 | Dajer et al. | 455/522 |
| 6,278,882 | B1 | * | 8/2001 | Choi | 455/453 |
| 6,618,597 | B1 | * | 9/2003 | Choi | 455/522 |
| 2001/0011018 | A1 | * | 8/2001 | Baum et al. | 455/439 |

(Continued)

FOREIGN PATENT DOCUMENTS

| CN | 1567790 A | * | 1/2005 |
|---|---|---|---|
| CN | 1592172 A | * | 3/2005 |
| CN | 1595862 A | * | 3/2005 |

OTHER PUBLICATIONS

English translation of CN1567790A in pdf format, Jan. 2005.*

(Continued)

*Primary Examiner* — Yuwen Pan
*Assistant Examiner* — Ayodeji Ayotunde
(74) *Attorney, Agent, or Firm* — Bright IP Law Offices (57) ABSTRACT

A higher limit of forward supplemental channel transmitting power of sector trunking group users is reduced or increased correspondingly based on whether sector power is overload, and it is set as a target maximum transmitting power of trunking group forward supplemental channels; the trunking group users are divided into groups based on channel board, and an adjusting step size is determined based on a ratio between trunking group combining transmitting power of the users divided and forward supplemental channel shared transmitting power of the sector trunking group, and a comparison between the forward supplemental channel shared transmitting power of the sector trunking group and target maximum transmitting power of the trunking group forward supplemental channels, and the higher limit of the forward supplemental channel transmitting power of sector trunking group is adjusted based on the adjusting step size.

12 Claims, 4 Drawing Sheets

U.S. PATENT DOCUMENTS

2002/0018270 A1* 2/2002 Bozenhardt ................... 359/181
2003/0022630 A1* 1/2003 Gandhi et al. .................. 455/69
2003/0083091 A1* 5/2003 Nuutinen et al. ............. 455/522
2005/0124369 A1* 6/2005 Attar et al. .................... 455/522
2005/0202839 A1* 9/2005 Merboth et al. ............. 455/522
2005/0243752 A1* 11/2005 Brueck et al. ................ 370/317

OTHER PUBLICATIONS

English translation of CN1592172A in pdf format, Mar. 2005.*
English translation of CN1595862A in pdf format, Mar. 2005.*

* cited by examiner

METHOD AND SYSTEMS FOR POWER OVERLOAD CONTROL OF THE TRUNKING GROUP FORWARD SUPPLEMENTAL CHANNEL

FIELD OF THE INVENTION

The invention relates to the field of mobile communication technique, particularly to a method and device for power overload control of the trunking group forward supplemental channel of the Code Division Multiple Access (CDMA) mobile communication system supporting the trunking service.

BACKGROUND OF THE INVENTION

The trunking communication system means the dedicated mobile communication system in which multiple users share one group of wireless channels and dynamically use these channels, which is a command dispatching system. The cellular trunking communication system combines the cellular communication system with the dedicated dispatching communication system, which expands the service extent of the cellular communication system, and makes the trunking communication system to be free from the limitations in function and region of the dedicated dispatch communication system. Moreover, combining the CDMA cellular communication system with the digital trunking communication system could not only improve the number of the trunking system's users in a single sector, but also could develop much more new services with the trunking system features on the basis of the high speed grouping data services.

The CDMA trunking communication system adopts the trunking system's half-duplex communication mode, i.e., in the existing CDMA cellular communication system, if the user service data sent forward within a trunking group are same, separate forward service channels are distributed to the trunking group users, so a mass of service channels might be needed to establish in the cell at the same time, the forward power raises rapidly, thereby causing the problems of forward overload, channel congestion, normal services interruption and etc, which are caused by the centralized burst of the system. At this time, the centralized burst of the system could further cause the voice activation factor (CDMA cellular communication system is the self-interference code division system, in which the transmitting power of a certain user is the interference for other users, so the call can not be kept full rate, and the non-full rate transmitting power could be reduced) of the CDMA cellular communication system invalid, supposing that the voice activation factor is 0.5, the forward capacity of the systems with trunking functions is reduced one half relative to the forward capacity of the common CDMA cellular communication system, thereby causing the whole capacity of the system reduced greatly. In this case, the solving method sharing the forward supplemental channel in the CDMA cellular trunking communication system was proposed.

Take example for CDMA2000, sharing the forward supplemental channel means that the base station assigns a forward basic channel respectively or a dedicated control channel to the sector trunking group users in the same sector (the sector trunking group user means the users belong to a same trunking group in a same sector) to deliver the signalings of the users themself. Each forward basic channel or the dedicated control channel has independent Walsh code (the channel code of variable length), same frame bias, and length code mask. The base station assigns a forward supplemental channel to the users in the same sector trunking group respectively, to deliver the users' service data. Each forward supplemental channel has the same Walsh code, frame bias, and length code mask; the service frame content are same at the same time. That is, although the data delivered by these forward supplemental channels are coded and modulated independently, but after overlapped in the final outputting end, they could be regarded as a one-way signal in practice. In the trunking communication system, the users within the trunking share the forward channel in the same cell. The trunking group users could talk with other users in the cell when calling or talking as long as press PTT (Push To Talk, button talking) button. This PIT services are widely applied to the dialogue system and the trunking system, and applied the groups of police, fire-fighting, traffic, airport aviation, building ground, large scale convention, military dispatching and the like with command dispatching functions. With the wide development of the mobile communication value-added services, CDMA trunking communication system with colony call, information sending functions has been becoming one new mobile value-added application.

As the forward supplemental channels of the trunking group users of the digital trunking communication systems are the same Walsh codes, so after the frames having same contents are modulated and frequency spreaded as well as combined, the computing manner of the trunking sectors transmitting power and the sectors transmitting power of the common CDMA systems will be different at this time. In the common CDMA systems, different users are distinguished with Walsh codes, when overlapping the uses with different Walsh codes, the power overlaps of different users are linear overlaps. The forward supplemental channels of the trunking group users are the same Walsh codes, the transmitting power of the trunking group in the sectors are obtained by linear overlap and subsequent square operation of the extent of emitting signals by each user in the trunking groups. At this time, the relationship of the forward supplemental channels transmitting powers of the users within the same trunking group of the same sector will be dependent square instead of independent overlap.

The change of the number of the trunking groups' users will cause the change of the higher and lower limits of the sector trunking group forward supplemental channel transmitting power, and the change is drastic (for example, when the number of the trunking groups' users is 20 and 1, the shared transmitting powers of the trunking group forward supplemental channels differ by 400 times). In this way, if there are too many users in the sector trunking groups, the forward supplemental channel transmitting power overlapped by the trunking group users could cause too high shared transmitting power of the forward supplemental channels even existing overload. As this power nonlinear overlap feature of the digital trunking communication systems, it is necessary to perform single power overlap control for each trunking group under each sector, causing that the shared transmitting power of the forward supplemental channels of the trunking group users of the digital trunking communication systems are controlled in the suitable range.

In summary, the nonlinear overlap of the forward supplemental channels transmitting power of the existing CDMA cellular trunking communication system with sharing forward service channels could cause the amplitude of the shared transmitting power control of the forward supplemental channels larger, and further appear the defect of the forward power overload.

SUMMARY OF THE INVENTION

The technique problem solved by this invention is to provide a method and device for power overload control of the trunking group forward supplemental channel, which realizes the power overload control of the trunking group forward supplemental channel in the CDMA cellular trunking communication system, and controls the shared transmitting power of the forward supplemental channels of the trunking groups' users in the digital trunking communication systems in the suitable extent.

In order to realize the above purpose, the invention provides A device for power overload control of a trunking group forward supplemental channel for setting the higher limit of a forward supplemental channel transmitting power of sector trunking group and controlling power overloads, wherein comprises:

a sector power saving and overload judgement module for saving a sector power and judging whether the sector power is overload;

a sector power overload control module for reducing or increasing the higher limit of the forward supplemental channel transmitting power of the sector trunking groups users correspondingly based on whether the sector power is overload, and setting the changed higher limit of the forward supplemental channel transmitting power of the sector trunking group as the target maximum transmitting power of the trunking group forward supplemental channels;

a trunking group forward supplemental channel power control module for dividing the sector trunking group users into groups based on a channel board, and determining the adjusting step size based on the ratio between a trunking group combining transmitting power of the users divided and a forward supplemental channel shared transmitting power of the sector trunking group, the comparison between the forward supplemental channel shared transmitting power of the sector trunking group and a target maximum transmitting power of the trunking group forward supplemental channels, and adjusting the higher limit of the forward supplemental channel transmitting power of the trunking group based on the adjusting step size.

In the above device for power overload control of a trunking group forward supplemental channel, the sector power overload control module specifically comprises:

a first trunking group forward supplemental channel transmitting power higher limit adjusting module for based on whether the sector power is overload, correspondingly reducing or increasing the higher limit of the forward supplemental channel transmitting power of the sector trunking group users according to the preset step size;

a trunking group forward supplemental channel target maximum transmitting power setting module for setting the adjusting higher limit of the forward supplemental channel transmitting power of the trunking group as the target maximum transmitting power of the trunking group forward supplemental channels.

In the above device for power overload control of a trunking group forward supplemental channel, the trunking group forward supplemental channel power control module specifically comprises:

a sector trunking group users grouping module for dividing the sector trunking group users into groups based on the channel board;

a grouping combination transmitting power and shared transmitting power setting saving module for determining and saving the trunking group combining transmitting power of the users divided and the forward supplemental channel shared transmitting power of the sector trunking group;

a trunking group forward supplemental channel transmitting power higher limit adjusting step size calculating module for obtaining the adjusting step size based on the ratio of the trunking group combining transmitting power of the users divided and the forward supplemental channel shared transmitting power of the sector trunking group, the comparison between the forward supplemental channel shared transmitting power of the sector trunking group and a target maximum transmitting power of the trunking group forward supplemental channels;

a second trunking group forward supplemental channel transmitting power higher limit adjusting module for adjusting the higher limit of the forward supplemental channel transmitting power of the trunking group users based on the adjusting step size.

In the above device for power overload control of a trunking group forward supplemental channel, the trunking group forward supplemental channel power control module further comprises a trunking group forward supplemental channel transmitting power higher limit final determining module for setting the lower one of the higher limit of the forward supplemental channel transmitting power of the trunking group users and the current actual forward supplemental channel transmitting power as the higher limit of the forward supplemental channel transmitting power of the trunking group, when the sector power is overload.

In order to better realize the above purpose, the invention further provides A method for power overload control of a trunking group forward supplemental channel for setting the higher limit of a forward supplemental channel transmitting power of sector trunking group and controlling power overloads, wherein comprising the steps of:

a sector power overload control step for reducing or increasing the higher limit of the forward supplemental channel transmitting power of the sector trunking group users correspondingly based on whether the sector power is overload, and setting the changed higher limit of the forward supplemental channel transmitting power of the sector trunking group as the target maximum transmitting power of the trunking group forward supplemental channels;

a trunking group forward supplemental channel power control step for dividing the sector trunking group users into groups based on a channel board, and determining the adjusting step size based on the ratio between a trunking group combining transmitting power of the users divided and a forward supplemental channel shared transmitting power of the sector trunking group, the comparison between the forward supplemental channel shared transmitting power of the sector trunking group and a target maximum transmitting power of the trunking group forward supplemental channels, and adjusting the higher limit of the forward supplemental channel transmitting power of the trunking group based on the adjusting step size.

In the above method for power overload control of a trunking group forward supplemental channel, the sector power overload control step specifically comprises the steps of:

step 201, a sector power saving and overload judgement module saves a sector power and judges whether the sector power is overload every preset time; and proceeding to step 202 if overload, otherwise to step 203;

step 202, a first trunking group forward supplemental channel transmitting power higher limit adjusting module reduces the higher limit of the forward supplemental channel transmitting power of the sector trunking group users, then proceeding to step 204;

step 203, when the higher limit of the forward supplemental channel transmitting power of the sector trunking group users is lower than the preset higher limit of the forward supplemental channel transmitting power of the trunking group, the first trunking group forward supplemental channel transmitting power higher limit adjusting module increases the higher limit of the forward supplemental channel transmitting power of the sector trunking group users, and proceeding to step 204;

step 204, a trunking group forward supplemental channel target maximum transmitting power setting module sets the higher limit of the forward supplemental channel transmitting power of the trunking group as the target maximum transmitting power of the trunking group forward supplemental channels.

The above method for power overload control of a trunking group forward supplemental channel further comprises judging whether the higher limit of the forward supplemental channel transmitting power of the sector trunking group is same as the preset higher limit of the forward supplemental channel transmitting power of the trunking group after step 202 and before step 203.

In the above method for power overload control of a trunking group forward supplemental channel, the higher limit of the forward supplemental channel transmitting power of the trunking group adjusted in step 202 is greater than or equal to the preset lower limit of the forward supplemental channel transmitting power of the trunking group, the higher limit of the forward supplemental channel transmitting power of the trunking group adjusted in the step 203 is less than or equal to the preset higher limit of the forward supplemental channel transmitting power of the trunking group.

In the above method for power overload control of a trunking group forward supplemental channel, the trunking group forward supplemental channel power control step specially comprises:

step 301, t a sector trunking group users grouping module divides the sector trunking group users into groups based on a channel board, a grouping combination transmitting power and shared transmitting power setting saving module determines and saves the trunking group combining transmitting power of the users divided and the forward supplemental channel shared transmitting power of the sector trunking group;

step 302, a trunking group forward supplemental channel transmitting power higher limit adjusting step size calculating module obtains the adjusting step size based on the ratio of the trunking group combining transmitting power of the users divided and the forward supplemental channel shared transmitting power of the sector trunking group, the comparison between the forward supplemental channel shared transmitting power of the sector trunking group and a target maximum transmitting power of the trunking group forward supplemental channels, this step specifically comprises the steps of:

step 3021, calculating the ratio $K=X/Y$ of the trunking group combining transmitting power X of each user divided and the forward supplemental channel shared transmitting power Y of the sector trunking group, as a cell adjusting proportion factor;

step 3022, judging whether the forward supplemental channel shared transmitting power Y of the sector trunking group is greater than or equal to the target maximum transmitting power Z of the trunking group forward supplemental channels, proceeding to step 3023 if so, otherwise to step 3025;

step 3023, setting a first adjusting difference to Q, wherein $Q=K*(Y-Z)$;

step 3024, determining the reduced step size based on the first adjusting difference Q, turning to step 303;

step 3025, setting a second adjusting difference to Q', wherein $Q'=K*(Z-Y)$; step 3026, determining the increased step size based on the second adjusting difference Q', turning to step 303;

step 303, a second trunking group forward supplemental channel transmitting power higher limit adjusting module adjusts the higher limit of the forward supplemental channel transmitting power of the trunking group users based on the adjusting step size.

In the above method for power overload control of a trunking group forward supplemental channel, trunking group forward supplemental channel power control step further comprises:

step 304, the sector power saving and overload judgement module judges whether the sector power is overload, and if overload, a trunking group forward supplemental channel transmitting power higher limit final determining module compares the higher limit of the forward supplemental channel transmitting power of the trunking group users with the current actual forward supplemental channel transmitting power of the trunking group and sets the lower one as the higher limit of the forward supplemental channel transmitting power of the trunking group, then returning to step 201, otherwise directly ending the flow.

Compared to the existing technique, the invention has the advantages of:

the device and method for power overload control of a trunking group forward supplemental channel of the present invention obtains the step size required for adjusting the higher limit of the forward supplemental channel transmitting power of the trunking group of each user divided by detecting whether the sector is overload to adjust the higher limit of the forward supplemental channel transmitting power of the trunking group, the ratio of the trunking group combining transmitting power of the users divided and the forward supplemental channel shared transmitting power of the sector trunking group, the comparison between the forward supplemental channel shared transmitting power of the sector trunking group and a target maximum transmitting power of the trunking group forward supplemental channels, then adjusts the higher limit of the forward supplemental channel transmitting power of the trunking group, so that the forward supplemental channel shared transmitting power of the trunking group in the trunking communication systems could be controlled in the suitable extent, thereby solving the problem of the trunking group group calling forward supplemental channel shared transmitting power overloads caused by non-linear addition of the trunking group group calling forward supplemental channel shared transmitting power.

EMBODIMENTS OF THE INVENTION

The present invention will be further described in detail with reference to the accompanying drawings and the embodiment thereof.

In order to realize the trunking group forward supplemental channel power overload control in CDMA trunking communication system, it is necessary for the mobile station, exchange, trunking scheduling server and client-side to support CDMA trunking services, and if not specially stated, the present invention is explained by taking the single group under single carrier frequency and sector as example. For the multiple groups under multiple carrier frequencies and sectors, each trunking group under each carrier frequency and sector is controlled according to the processing manner of the single group under single carrier frequency and sector.

Figure 1:
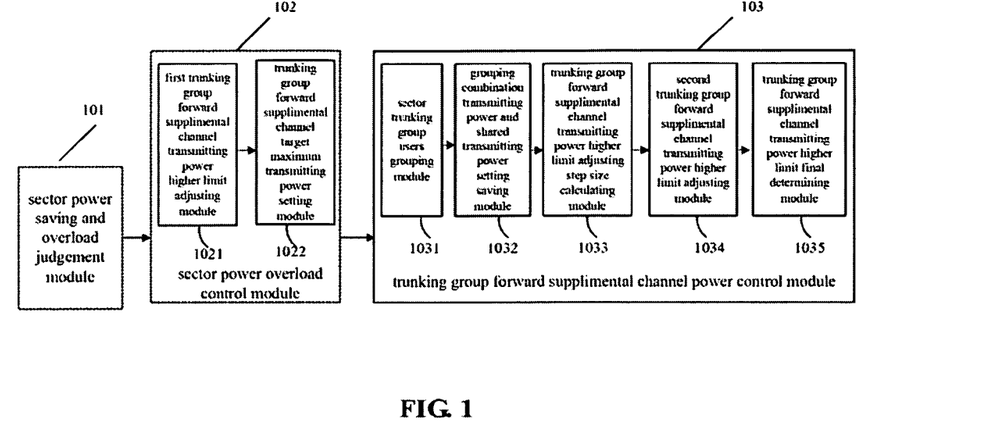
FIG. 1 is a view of the device for power overload control of a trunking group forward supplemental channel of the present invention.

FIG. 1 is a view of the device for power overload control of a trunking group forward supplemental channel of the present invention, referring to FIG. 1, the device for power overload control of a trunking group forward supplemental channel in the digital trunking communication system of the invention is used for setting the higher limit of the forward supplemental channel transmitting power of the trunking group and effectively controlling the overload, the device comprises:

a sector power saving and overload judgement module 101 for saving a sector power and judging whether the sector power is overload;

a sector power overload control module 102 for reducing or increasing the higher limit of the forward supplemental channel transmitting power of the sector trunking groups users correspondingly based on whether the sector power is overload, and setting the changed higher limit of the forward supplemental channel transmitting power of the sector trunking group as the target maximum transmitting power of the trunking group forward supplemental channels;

a trunking group forward supplemental channel power control module 103 for dividing the sector trunking group users into groups based on a channel board, and determining the adjusting step size based on the ratio between a trunking group combining transmitting power of the users divided and a forward supplemental channel shared transmitting power of the sector trunking group, the comparison between the forward supplemental channel shared transmitting power of the sector trunking group and a target maximum transmitting power of the trunking group forward supplemental channels, and adjusting the higher limit of the forward supplemental channel transmitting power of the trunking group based on the adjusting step size.

The sector power overload control module 102 specially comprises the modules of:

a first trunking group forward supplemental channel transmitting power higher limit adjusting module 1021 for based on whether the sector power is overload, correspondingly reducing or increasing the higher limit of the forward supplemental channel transmitting power of the sector trunking group users according to the preset step size;

a trunking group forward supplemental channel target maximum transmitting power setting module 1022 for setting the adjusting higher limit of the forward supplemental channel transmitting power of the trunking group as the target maximum transmitting power of the trunking group forward supplemental channels.

The trunking group forward supplemental channel power control module 103 specially comprises the modules of:

a sector trunking group users grouping module 1031 for dividing the sector trunking group users into groups based on the channel board;

a grouping combination transmitting power and shared transmitting power setting saving module 1032 for determining and saving the trunking group combining transmitting power of the users divided and the forward supplemental channel shared transmitting power of the sector trunking group;

a trunking group forward supplemental channel transmitting power higher limit adjusting step size calculating module 1033 for obtaining the adjusting step size based on the ratio of the trunking group combining transmitting power of the users divided and the forward supplemental channel shared transmitting power of the sector trunking group, the comparison between the forward supplemental channel shared transmitting power of the sector trunking group and a target maximum transmitting power of the trunking group forward supplemental channels;

a second trunking group forward supplemental channel transmitting power higher limit adjusting module 1034 for adjusting the higher limit of the forward supplemental channel transmitting power of the trunking group users based on the adjusting step size;

a trunking group forward supplemental channel transmitting power higher limit final determining module 1035 for setting the lower one of the higher limit of the forward supplemental channel transmitting power of the trunking group users and the current actual forward supplemental channel transmitting power as the higher limit of the forward supplemental channel transmitting power of the trunking group, when the sector power is overload.

Figure 2:
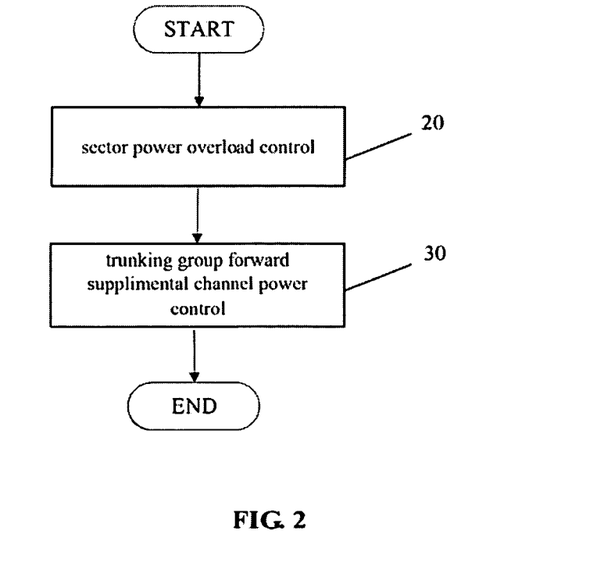
FIG. 2 is a general flowchart of the method for power overload control of a trunking group forward supplemental channel of the present invention.

FIG. 2 is a general flowchart of the method for power overload control of a trunking group forward supplemental channel of the present invention, as shown in FIG. 2, the method for power overload control of a trunking group forward supplemental channel of the present invention comprises a sector power overload control step 20 and trunking group forward supplemental channel power control step 30 performed based on the sector power overload control step 20, the higher limit of the trunking group forward supplemental channel power is set by the above two steps to effectively control the overload.

Figure 3:
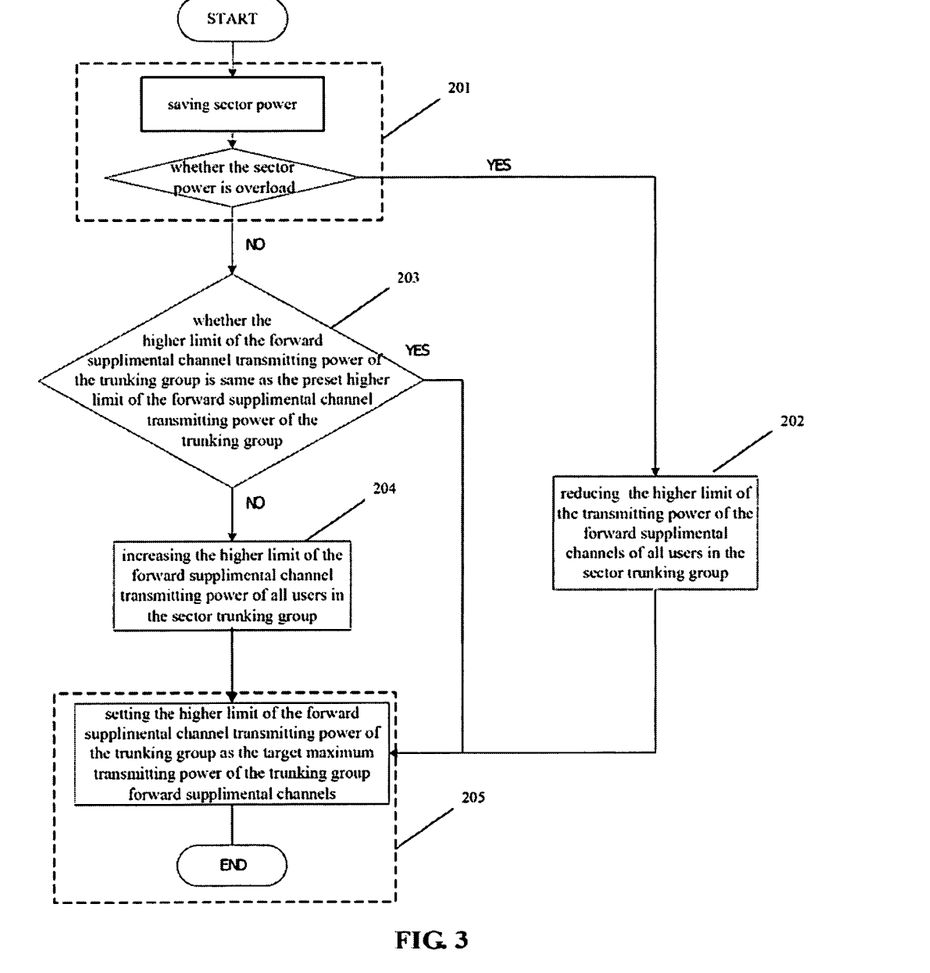
FIG. 3 is a flowchart of the sector power overload control step.
Figure 4:
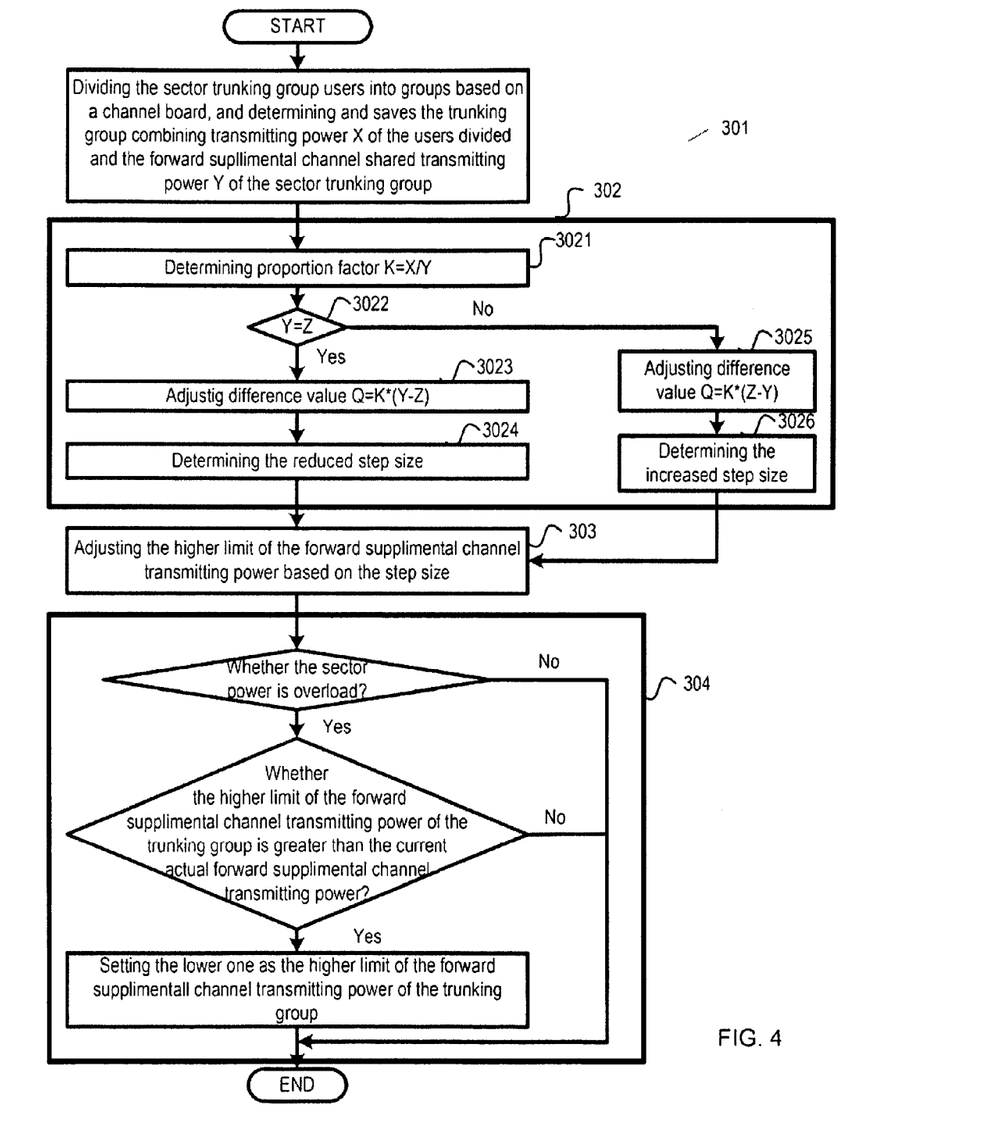
FIG. 4 is a flowchart of the trunking group forward supplemental channel power control step.

Therein, the flow of the sector power overload control step and the trunking group forward supplemental channel power control step are shown in FIG. 3 and FIG. 4 respectively.

Referring to FIG. 3, in the sector power overload control step, the sector power overload control module reduces or increases the higher limit of the forward supplemental channel transmitting power of the sector trunking group users correspondingly based on whether the sector power is overload, and sets the changed higher limit of the forward supplemental channel transmitting power of the sector trunking group as the target maximum transmitting power of the trunking group forward supplemental channels, specially comprising the steps of:

step 201, a sector power saving and overload judgement module saves a sector power and judges whether the sector power is overload every preset time, and proceeding to step 202 if overload, otherwise to step 203;

step 202, a first trunking group forward supplemental channels transmitting power higher limit adjusting module reduces the higher limit of the transmitting power of the forward supplemental channels of all users in the sector trunking group, then proceeding to step 205, in this step, supposed that the adjusting step size is 1 dB, the higher limit of the forward supplemental channel transmitting power of the trunking group is reduced by 1 dB, but the adjusted higher limit of the forward supplemental channel transmitting power of the trunking group could not less than the preset lower limit of the forward supplemental channel transmitting power of the trunking group;

step 203, judging whether the higher limit of the forward supplemental channel transmitting power of the trunking group is same as the preset higher limit of the forward supplemental channel transmitting power of the trunking group, proceeding to step 205 if so, otherwise proceeding to step 204;

step 204, the first trunking group forward supplemental channel transmitting power higher limit adjusting module increases the higher limit of the forward supplemental channel transmitting power of all users in the sector trunking group, then proceeding to step 205, the adjusted higher limit of the forward supplemental channel transmitting power of the sector trunking group could not greater than the preset higher limit of the forward supplemental channel transmitting power of the trunking group;

step 205, the trunk ing group forward supplemental channel target maximum transmitting power setting module sets the higher limit of the forward supplemental channel transmitting power of the trunking group as the target maximum transmitting power Z of the trunking group forward supplemental channels, then ending the sector power overload control step.

Referring to FIG. 4, in the trunking group forward supplemental channel power control step, dividing the sector trunking group users into groups based on a channel board, and determining the adjusting step size based on the ratio between a trunking group combining transmitting power of the users divided and a forward supplemental channel shared transmitting power of the sector trunking group, the comparison between the forward supplemental channel shared transmitting power of the sector trunking group and a target maximum transmitting power of the trunking group forward supplemental channels, and correspondingly adjusting the higher limit of the forward supplemental channel transmitting power of the trunking group, specially comprising the steps of:

step 301, a sector trunking group users grouping module divides the sector trunking group users into groups based on a channel board, a grouping combination transmitting power and shared transmitting power setting saving module determines and saves the trunking group combining transmitting power X of the users divided and the forward supplemental channel shared transmitting power Y of the sector trunking group, the trunking group forward supplemental channel power control controls the higher limit of the grouped trunking group forward supplemental channels respectively;

step 302, every predetermined time, the trunking group forward supplemental channel transmitting power higher limit adjusting step size computing module obtains the step size required for adjusting the higher limit of the forward supplemental channel transmitting power of the trunking group of each group users divided based on the ratio the trunking group combining transmitting power X of the users divided in the step 301 and the forward supplemental channel shared transmitting power Y of the sector trunking group, the comparison between the forward supplemental channel shared transmitting power of the sector trunking group and a target maximum transmitting power of the trunking group forward supplemental channels, specifically comprising the steps of:

step 3021, computing the ratio of the trunking group combining transmitting power X of each user divided and the forward supplemental channel shared transmitting power Y of the sector trunking group, as a cell adjusting proportion factor K, i.e. $K=X/Y$;

step 3022, judging whether the forward supplemental channel shared transmitting power Y of the sector trunking group is greater than or equal to the target maximum transmitting power Z of the trunking group forward supplemental channels, proceeding to step 3023 if so, otherwise to step 3025;

step 3023, setting a first adjusting difference to Q, wherein $Q=K*(Y-Z)$;

step 3024, determining the reduced step size based on the first adjusting difference Q, turning to step 303, wherein the adjusting difference Q determines the increasing step size, that is dynamically adjusting: if Q is high, the reducing step size is large; if Q is low, the reducing step size is small; the same to determine the increasing step size;

step 3025, setting a adjusting difference $Q=K*(Z-Y)$;

step 3026, determining the increased step size based on the second adjusting difference Q', turning to step 303;

step 303, the second trunking group forward supplemental channel transmitting power higher limit adjusting module adjusts the higher limit of the forward supplemental channel transmitting power of each user divided based on the step size respectively, the adjusted higher limit of the transmitting power could not less than the preset lower limit of the trunking group forward supplemental channel power, while could not greater than the target maximum transmitting power Z of the trunking group forward supplemental channels set in the sector overload control step 20;

step 304, the sector power saving and overload judgement module judges whether the sector power is overload, and if overload, a trunking group forward supplemental channel transmitting power higher limit final determining module compares the higher limit of the forward supplemental channel transmitting power of the trunking group users with the current actual forward supplemental channel transmitting power of the trunking group and sets the lower one as the higher limit of the forward supplemental channel transmitting power of the trunking group, then returning to step 201, otherwise directly ending the flow.

In step 303, if $Y \geq Z$, the trunking group forward supplemental channel power X of the group users should approach to $X-Q=X-K*(Y-Z)$, reduce the higher limit of the trunking group forward supplemental channels of the group users; if $Y<Z$, the trunking group forward supplemental channel power X of the group users should approach to $X+Q=X+K*(Z-Y)$, raise the higher limit of the trunking group forward supplemental channels of the group users.

Figure 5:
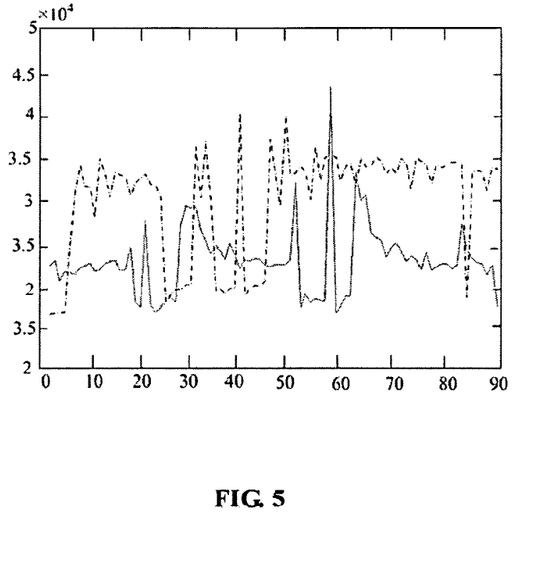
FIG. 5 is a schematic view of the technique effect of the present invention.

FIG. 5 is a change comparison diagram of the trunking group forward supplemental channel power having and without the sector trunking group forward supplemental channels shared transmitting power of the overload controlling in real trunking communication system. The abscissa in the figure is time in unit 200 ms. The ordinate indicates the PTT FSCH overall power in unit mW. The dashed lines in the figure is the power-time graph which is not performed PTT FSCH power overload controlling. The real lines in the figure is the power-time graph which is performed PTT FSCH power overload controlling. It can be seen from the figure, when there is trunking group forward supplemental channel power overload controlling, the shared transmitting power of the sector trunking group forward supplemental channels is lower than that of when there is no trunking group forward supplemental channel power overload controlling. The power overload controlling of the trunking group forward supplemental channels of the trunking communication systems could effect the power controlling effect of the trunking systems advantageously, the shared transmitting power of the trunking group calling forward supplemental channel overlap in CDMA cellular trunking communication systems being controlled in suitable range, avoiding power overload.

Of course, the invention could further have other different embodiments. Those skilled in the art could make various according change and alterations without departing from the scope and spirit of the invention, insofar as they are within the protecting scope of the appended claims of the invention.

INDUSTRY APPLICATION

The invention is applied to the trunking communication systems. The application of the trunking group forward supplemental channel power overload controlling device and method control the shared transmitting power of the forward supplemental channels of the trunking communication systems trunking group in the suitable range, solving the problem that the shared transmitting power of trunking group calling forward supplemental channels is too high due to the nonlinear overlap of the trunking group calling forward supplemental channels.

What is claimed is:

1. A device for power overload control of a trunking group forward supplemental channel for setting the higher limit of a forward supplemental channel transmitting power of sector trunking group and controlling power overloads, characterized in that comprises:
   a sector power saving and overload judgment module for saving a sector power and judging whether the sector power is overload;
   a sector power overload control module for reducing or increasing the higher limit of the forward supplemental channel transmitting power of the sector trunking groups users correspondingly based on whether the sector power is overload, and setting the changed higher limit of the forward supplemental channel transmitting power of the sector trunking group as the target maximum transmitting power of the trunking group forward supplemental channels;
   a trunking group forward supplemental channel power control module for dividing the sector trunking group users into groups based on a channel board, and determining the adjusting step size based on the ratio between a trunking group combining transmitting power of the users divided and a forward supplemental channel shared transmitting power of the sector trunking group, the comparison between the forward supplemental channel shared transmitting power of the sector trunking group and a target maximum transmitting power of the trunking group forward supplemental channels, and adjusting the higher limit of the forward supplemental channel transmitting power of the trunking group based on the adjusting step size.

2. The device for power overload control of a trunking group forward supplemental channel according to claim 1, characterized in that the sector power overload control module specifically comprises:
   a first trunking group forward supplemental channel transmitting power higher limit adjusting module for based on whether the sector power is overload, correspondingly reducing or increasing the higher limit of the forward supplemental channel transmitting power of the sector trunking group users according to the preset step size;
   a trunking group forward supplemental channel target maximum transmitting power setting module for setting the adjusting higher limit of the forward supplemental channel transmitting power of the trunking group as the target maximum transmitting power of the trunking group forward supplemental channels.

3. The device for power overload control of a trunking group forward supplemental channel according to claim 1, characterized in that the trunking group forward supplemental channel power control module specifically comprises;
   a sector trunking group users grouping module for dividing the sector trunking group users into groups based on the channel board;
   a grouping combination transmitting power and shared transmitting power setting saving module for determining and saving the trunking group combining transmitting power of the users divided and the forward supplemental channel shared transmitting power of the sector trunking group;
   a trunking group forward supplemental channel transmitting power higher limit adjusting step size calculating module for obtaining the adjusting step size based on the ratio of the trunking group combining transmitting power of the users divided and the forward supplemental channel shared transmitting power of the sector trunking group, the comparison between the forward supplemental channel shared transmitting power of the sector trunking group and a target maximum transmitting power of the trunking group forward supplemental channels;
   a second trunking group forward supplemental channel transmitting power higher limit adjusting module for adjusting the higher limit of the forward supplemental channel transmitting power of the trunking group users based on the adjusting step size.

4. The device for power overload control of a trunking group forward supplemental channel according to claim 1, characterized in that the trunking group forward supplemental channel power control module further comprises:
   a trunking group forward supplemental channel transmitting power higher limit final determining module for setting the lower one of the higher limit of the forward supplemental channel transmitting power of the trunking group users and the current actual forward supplemental channel transmitting power as the higher limit of the forward supplemental channel transmitting power of the trunking group, when the sector power is overload.

5. A method for power overload control of a trunking group forward supplemental channel for setting the higher limit of forward supplemental channel transmitting power of sector trunking group and controlling power overloads, characterized in that comprising the steps of:
   a sector power overload control step for reducing or increasing the higher limit of the forward supplemental channel transmitting power of the sector quaking group users correspondingly based on whether the sector power is overload, and setting the changed higher limit of the forward supplemental channel transmitting power of the sector trunking group as the target maximum transmitting power of the trunking group forward supplemental channels;
   a trunking group forward supplemental channel power control step for dividing the sector trunking group users into groups based on a channel board, and determining the adjusting step size based on the ratio between a trunking group combining transmitting power of the users divided and a forward supplemental channel shared transmitting power of the sector trunking group, the comparison between the forward supplemental channel shared transmitting power of the sector trunking group and a target maximum transmitting power of the trunking group forward supplemental channels, and adjusting the higher limit of the forward supplemental channel transmitting power of the trunking group based on the adjusting step size.

6. The method for power overload control of a trunking group forward supplemental channel according to claim 5, characterized in that the sector power overload control step specifically comprises the steps of:

step 201, a sector power saving and overload judgment module saves a sector power and judges whether the sector power is overload every preset time, and proceeding to step 202 if overload, otherwise to step 203;

step 202, a first trunking group forward supplemental channel transmitting power higher limit adjusting module reduces the higher limit of the forward supplemental channel transmitting power of the sector trunking group users, then proceeding to step 204;

step 203, when the higher limit of the forward supplemental channel transmitting power of the sector trunking group users is lower than the preset higher limit of the forward supplemental channel transmitting power of the trunking group, the first trunking group forward supplemental channel transmitting power higher limit adjusting module increases the higher limit of the forward supplemental channel transmitting power of the sector trunking group users, and proceeding to step 204;

step 204, a trunking group forward supplemental channel target maximum transmitting power setting module sets the higher limit of the forward supplemental channel transmitting power of the trunking group as the target maximum transmitting power of the trunking group forward supplemental channels.

7. The method for power overload control of a trunking group forward supplemental channel according to claim 6, characterized in that further comprises judging whether the higher limit of the forward supplemental channel transmitting power of the sector trunking group is same as the preset higher limit of the forward supplemental channel transmitting power of the trunking group after step 202 and before step 203.

8. The method for power overload control of a trunking group forward supplemental channel according to claim 6, characterized in that the higher limit of the forward supplemental channel transmitting power of the trunking group adjusted in step 202 is greater than or equal to the preset lower limit of the forward channel transmitting power of the trunking group, the higher limit of the forward supplemental channel transmitting power of the trunking group adjusted in the step 203 is less than or equal to the preset higher limit of the forward supplemental channel transmitting power of the trunking group.

9. The method for power overload control of a trunking group forward supplemental channel according to claim 5, characterized in that the trunking group forward supplemental channel power control step specially comprises:

step 301, a sector trunking group users grouping module divides the sector trunking group users into groups based on a channel board, a grouping combination transmitting power and shared transmitting power setting saving module determines an saves the trunking group combining transmitting power of the users divided and the forward supplemental channel shared transmitting power of the sector trunking group;

step 302, a trunking group forward supplemental channel transmitting power higher limit adjusting step size calculating module obtains the adjusting step size based on the ratio the trunking group combining transmitting power of the users divided and the forward supplemental channel shared transmitting power of the sector trunking group, the comparison between the forward supplemental channel shared transmitting power of the sector trunking group and a target maximum transmitting power of the trunking group forward supplemental channels;

step 303, a second trunking group forward supplemental channel transmitting power higher limit adjusting module adjusts the higher limit of the forward supplemental channel transmitting power of the trunking group users based on the adjusting step size.

10. The method for power overload control of a trunking group forward supplemental channel according to claim 9, characterized in that the trunking group forward supplemental channel power control step further comprises:

step 304, the sector power saving and overload judgment module judges whether the sector power is overload, and if overload, a trunking group forward supplemental channel transmitting power higher limit final determining module compares the higher limit of the forward supplemental channel transmitting power of the trunking group users with the current actual forward supplemental channel transmitting power of the trunking group and sets the lower one as the higher limit of the forward supplemental channel transmitting power of the ranking group, then returning to step 201, otherwise directly ending the flow.

11. The method for power overload control of a trunking group forward supplemental channel according to claim 9, characterized in that step 302 specially comprises the steps of:

step 3021, calculating the ratio K=XIY of the trunking group combining transmitting power X of each user divided and the forward supplemental channel shared transmitting power Y of the sector trunking group, as a cell adjusting proportion factor;

step 3022, judging whether the forward supplemental channel shared transmitting power Y of the sector trunking group is greater than or equal to the target maximum transmitting power 7 of the trunking group forward supplemental channels, proceeding to step 3023 if so, otherwise to step 3025;

step 3023, setting a first adjusting difference to Q, wherein Q=K*(Y−Z);

step 3024, determining the reduced step size based on the first adjusting difference Q, turning to step 303;

step 3025, setting a second adjusting difference to Q', wherein Q'=K*(Z−V);

step 3026, determining the increased step size based on the second adjusting difference Q', turning to step 303.

12. The method for power overload control of a trunking group forward supplemental channel according to claim 9, characterized in that in step 303, the higher limit adjusted of the forward supplemental channel transmitting power of the trunking group user is greater than or equal to the preset lower limit of the forward supplemental channel transmitting power of the trunking group, and less than or equal to the target maximum transmitting power of the trunking group forward supplemental channels.

* * * * *